United States Patent [19]

Snow et al.

[11] 4,062,186

[45] Dec. 13, 1977

[54] APPARATUS FOR WINDMILL STARTS IN GAS TURBINE ENGINES

[75] Inventors: Barton H. Snow, Wyoming; Frank R. Homan, Cincinnati, both of Ohio

[73] Assignee: General Electric Company, Cincinnati, Ohio

[21] Appl. No.: 686,014

[22] Filed: May 13, 1976

[51] Int. Cl.² ............................ F02K 3/06; F02K 3/12
[52] U.S. Cl. ............................... 60/226 R; 60/39.14; 60/39.16 S; 60/39.18 C
[58] Field of Search .................. 60/226 R, 226 A, 224, 60/269, 204, 223, 262, 39.14, 39.16 S, 39.16 C, 39.18 C; 244/53 A

[56] References Cited

U.S. PATENT DOCUMENTS

| 2,952,973 | 9/1960 | Hall et al. ..................... 60/39.18 C |
| 3,719,428 | 3/1973 | Dettmering .................. 60/39.18 C |
| 3,940,926 | 3/1976 | Craig ................................. 60/269 |

FOREIGN PATENT DOCUMENTS 1,029,635  6/1953  France ............................. 60/226 R Primary Examiner—William L. Free
Assistant Examiner—Robert E. Garrett
Attorney, Agent, or Firm—Dana F. Bigelow; Derek P. Lawrence

[57] ABSTRACT

A torque converter is interconnected between the fan and core rotor of a turbofan engine such that the speed of the core rotor can be boosted from windmill speed to a speed sufficient to allow an in-flight start by selectively extracting power from the windmilling fan during the start sequence of the engine. Control logic is included to automatically drain the oil from, and thereby unload, the torque converter whenever the engine is in the operating speed region. Further assurance is provided by an overrunning clutch which decouples the system when the core rotational speed exceeds the converter output.

11 Claims, 2 Drawing Figures

APPARATUS FOR WINDMILL STARTS IN GAS TURBINE ENGINES

BACKGROUND OF THE INVENTION

This invention relates generally to gas turbine engines and, more particularly, to start systems for gas turbines of the turbofan type.

The method by which gas turbine engines are started is by rotating the high pressure compressor up to a speed sufficient to provide air, under pressure, to support combustion in the combustion chamber. After the engine is fired, the starter must assist the engine until it has reached the self-accelerating speed, with the torque required being in excess of the torque required to overcome rotor inertia, engine accessory loads, the friction loads of the engine, and the extracted loads of aircraft accessories. Various power sources are used to start a gas turbine engine, among which are the use of electricity, gas, air and hydraulic pressure. Whichever method is used, it must be capable of developing a very high amount of power in a short time and transmitting it to the engine rotating assembly in a manner which provides a smooth acceleration from rest, up to a speed at which the gas flow provides sufficient power to the engine turbine to enable it to take over. This requirement is easily met by many different types of on-ground power supply systems or from power systems carried aboard the aircraft. If a flameout occurs to an engine during flight, the supply of thermal energy to the turbines will discontinue and the rotational speed of the compressor spool will accordingly decrease considerably; however, the engine will continue to rotate due to the flow of air through the compressor, a phenomenon which is commonly referred to as windmilling. In a turbojet engine, there is a large volume of air which passes through the compressor following a flameout, and the windmill speed of the core engine is sufficient for an in-flight start.

In the case of a turbofan engine, however, wherein a good portion of the air which enters the inlet of the engine passes around the engine core, the high pressure compressor rotor receives a smaller portion of the available ram energy and therefore does not attain as high a windmill speed as in turbojet engine. This is particularly true of a turbofan of the mixed-flow type where a common nozzle provides additional restriction to core airflow and lowers windmill speed. If the windmill speed of the core is not sufficient, then an air start cannot be obtained without some kind of starter assist. Since the ability of an engine to relight varies with altitude and forward speed of the aircraft, a starter assist may not be required over the entire flight envelope of an aircraft, but only over a portion thereof, such as, for example, during periods of low-speed flight.

One method by which a starter assist is provided for air starts is that of an auxiliary power unit (A. P. U.) wherein a gas turbine located aboard the aircraft provides shaft power to the core by way of a gearbox. After the engine is started and a predetermined engine speed is attained, a control valve is automatically closed and automatically disengages the drive mechanism. Another method employed is that of cartridge starting, wherein the starter motor is basically a small impulse-type turbine which is driven by high velocity gases from a burning cartridge. The power output of the turbine is passed through a reduction gear and an automatic disconnect mechanism to rotate the engine. Another method employed is that of the combustor air starter wherein the starter unit has a small combustion chamber into which high pressure air from an aircraft-mounted storage bottle along with atomized fuel are introduced and ignited to generate resultant gases which are directed onto the air-starter turbine.

Whatever method is used, auxiliary torque sources which need start-up or which can only be used once per flight are restrictive in their use.

It is therefore an object of the present invention to provide for a turbofan engine an improved starter-assist system which is always ready for quick and reliable application.

Another object of this invention is to provide a means by which a turbofan engine can be air started over a much larger portion of the flight envelope.

Still another object of this invention is the provision in a turbo-fan engine for an air-start assist system which is relatively light in weight, effective in use, and simple in operation.

These objects and other features and advantages become more readily apparent upon reference to the following description when taken in conjunction with the appended drawings.

SUMMARY OF THE INVENTION

Briefly, in one aspect of the invention, power is selectively derived from the rotation of the windmilling fan of an in-flight engine to be started. This power is then applied to rotate the compressor rotor of the engine to a speed sufficient to allow a relight of the engine. After the compressor reaches a predetermined speed, the drive system is automatically disconnected from the core.

By another aspect of this invention, a torque converter transmits power from the windmilling fan of the turbofan engine to drive the high pressure compressor rotor. An electrohydraulic servovalve automatically inactivates the torque converter by removing the hydraulic fluid therefrom during periods in which the starter assist system is not required. An overrunning clutch is further provided to ensure that system is decoupled when the core rotational speed exceeds the converter output.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
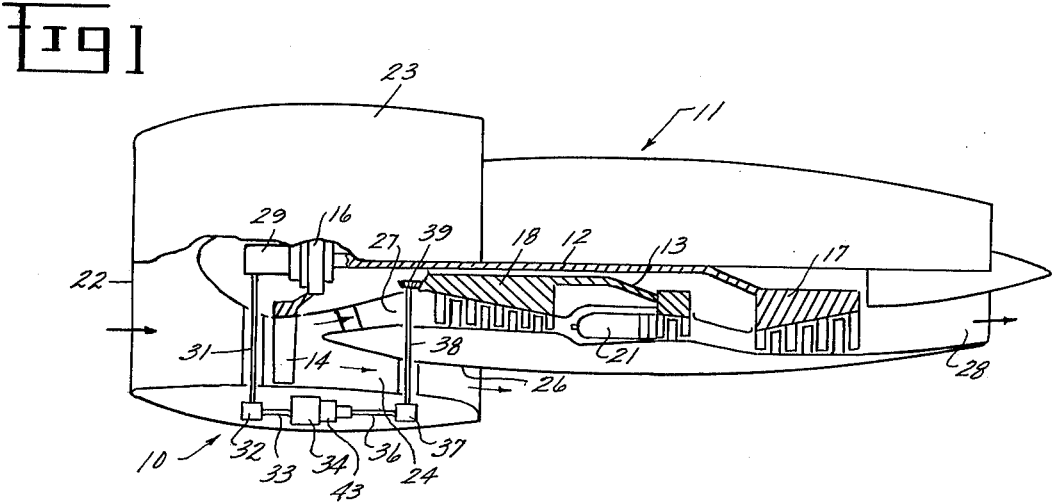
FIG. 1 is a schematic representation of a gas turbine engine in which the present invention is embodied.

Referring now to FIG. 1, the present invention is shown generally at 10 as installed in a turbofan engine 11 having a fan rotor 12 and a core engine rotor 13. The fan rotor 12 includes a plurality of fan blades 14 mounted for rotation on a disc 16 and a low pressure or fan turbine 17 which drives the fan disc 16 in a well-known manner. Core engine rotor 13 includes a compressor 18 and a high pressure turbine 19 which drives the compressor 18. The core engine also includes a combustion system 21 which combines a fuel with the airflow and ignites the mixture to inject thermal energy into the system.

In operation, air enters the gas turbine engine 11 through an air inlet 22 provided by means of a suitable cowling or nacelle 23 which surrounds the fan rotor 12. Air entering the inlet 22 is compressed by means of the rotation of the fan blades 14 and thereafter is split between an annular passageway 24 defined by the nacelle 23 and an engine casing 26, and the core engine passageway 27 having its external boundary defined by the engine casing 26. The pressurized air which enters the core engine passageway 27 is further pressurized by means of compressor 18 and thereafter is ignited along with fuel from the combustion system 21. This highly energized gas stream then flows through the high pressure turbine 19 to drive the compressor 18 and thereafter through the fan turbine 17 to drive the fan rotor disc 16. Gas is then passed out the main nozzle 28 to provide propulsion forces to the engine in a manner well known in the art. Additional propulsive force is obtained by the exhaust pressurized air from the annular passageway 24.

It should be recognized that, although the turbofan 11 is depicted as having a short cowl or nacelle 23, it may very well have a long duct nacelle which extends aft to the main nozzle or it may be of the mixed flow type wherein a mixer is provided to combine the gas stream flow from the fan duct annular passageway 24 and that from the core engine to exhaust from a single nozzle.

Assume now that the present turbofan engine, during in-flight operation, suffers a flameout, such as may occur by a malfunction of the fuel system or from a compressor stall condition wherein the air supply to the combustor is drastically disrupted. Since the flow of combustion gases to the turbines 19 and 17 will discontinue, the driving power to the compressor 18 and the fan rotor 12 will be removed and they will accordingly coast down in rotational speed. However, since the forward speed of the engine will cause the air to continue to flow through the passageways 24 and 27, both the fan rotor 12 and the core engine rotor 13 will continue to rotate because of the well-known windmill effect. The relative amount of air which flows into the passageways 24 and 27 will depend on their respective sizes, the ratio of which determines the bypass ratio of a turbofan engine. During certain operational conditions, as for example at high speeds, the airflow through the compressor will be sufficient to windmill the compressor rotor to a speed which will allow a relight of the engine, but there will be other periods of operation during which this rotational windmill speed will not be sufficient to support a relight. The present invention is designed for use during such periods of operation.

Whether dealing with a high bypass ratio or a low bypass ratio turbofan, it will be recognized that all of the air which enters the inlet 22 passes through the plane of the fan blades 14 to thereby impart a windmilling effect thereto, but only a portion thereof passes through the compressor 18. Accordingly, it is understandable that a great deal more energy is transmitted to the fan rotor 12 than to the core engine rotor 13 during windmilling conditions of operation. Since it is the core rotor rather than the fan rotor which must be turning at a minimum speed in order to obtain an engine relight, power may be tansmitted from the fan rotor to the core rotor during such periods of operation. One method of transmitting this power is shown schematically in FIG. 1.

A drive mechanism with associated gearbox 29 is connected to the front end of and driven directly by the fan rotor 12 whenever it is rotating, either by power received from the turbine 17 or by way of the windmilling of the fan blades 14 during periods in which the engine is in flight but is not lit off. The gearbox 29 is in turn mechanically connected through a shaft 31, a bevel gear 32, and a drive shaft 33, to a torque converter 34, which in turn transmits power through an output shaft 36, an output bevel gear 37 and a shaft 38 to a drive gear 39 adapted to drive the core engine rotor 13. By way of this gear train, wherein the radially extending shafts 31 and 38 are disposed within appropriate struts as shown, and the axially extending torque conversion equipment are placed in the nacelle 23, rotary power may by transmitted from the fan rotor 12 to the core rotor 13 during periods in which the windmilling fan rotor has an abundance of unused energy and the core engine rotor is not rotating at sufficient speeds to relight the engine. Control logic is provided to appropriately switch in the torque conversion apparatus during selected periods in which engine relight is required, and to switch out the system during all other times such as, for example, when the airplane is on the ground or when the engine is started and up to speed.

Figure 2:
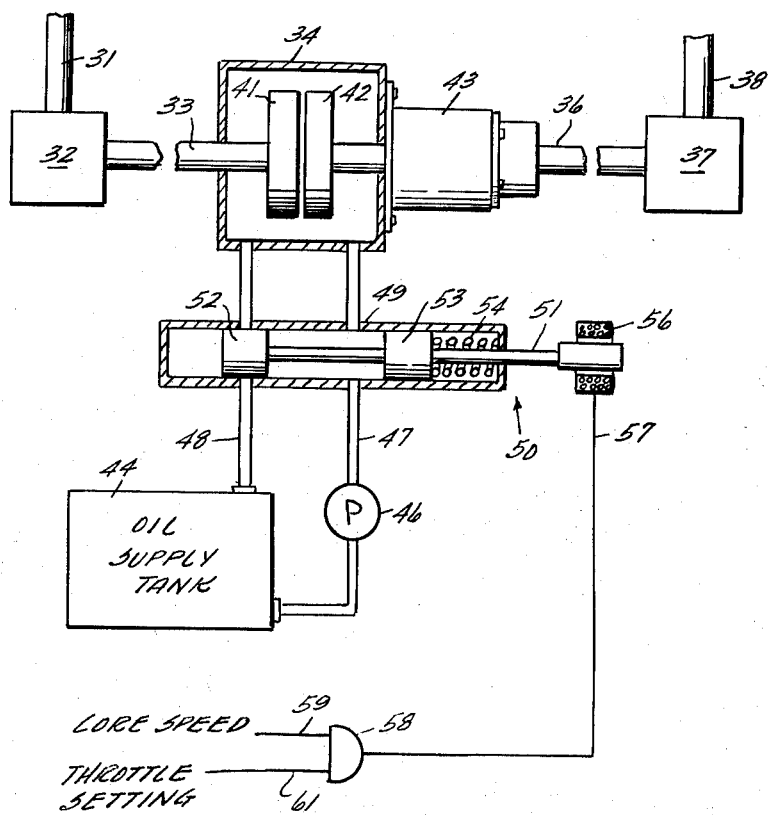
FIG. 2 is a schematic representation of the hydraulic and control portion in accordance with one embodiment of the invention.

Referring now to FIG. 2, the torque converter 34 is shown with its input shaft 33 and its output shaft 36. Power is transmitted between the two shafts by way of input and output impellers 41 and 42 acting through a medium of hydraulic fluid within the torque converter housing as is well known in the art. As long as there is hydraulic fluid within the torque converter 34, the rotating input impeller 41 will tend to cause a swirling of the fluid which in turn will cause the turning of the output impeller 42 and therefore the output shaft 36. It should be understood that a gear train of either the fixed or variable gear ratio type may be incorporated between the fan and core rotors so as to obtain greater speeds of the core shaft.

Assume now that a flameout has occurred and that the torque converter has been activated so as to connect the rotary power of the fan rotor 12 to that of the core rotor 13 to boost its speed up to that sufficient for a relight. Following relight, the core engine rotor speed will increase to an angular velocity greater than that of the fan rotor 12, and if it were only a rigid gear train interposed between the two rotors, the core engine rotor 13 would tend to pump energy back into the torque converter 34 to thereby impart rotary motion to the fan rotor. This direct gear drive between the two independent systems during normal flight operation is undesirable for obvious reasons, and it is therefore necessary to disengage the drive train during such periods to prevent the transmission of power in the reverse direction. An overrunning clutch 43 is therefore placed at the output of the torque converter 34, wherein it allows power to be transmitted from the fan to the rotor (left to right), but does not allow power to be transmitted from the core rotor to the fan rotor (right to left). It accomplishes this by automatically decoupling the system whenever the core rotational speed exceeds that of the converter output.

It will be recognized that when an engine has been satisfactorily started and has reached a speed sufficient to sustain combustion, even though the gear train may have been decoupled by operation of the overrunning clutch 43, the driving of the torque converter 34 imposes a load on the fan rotor 12 which is not desirable.

Accordingly, an electrohydraulic servovalve 50 is provided to inactivate the torque converter during periods in which its operation is not desired. The hydraulic system associated with the torque converter 34 includes an oil supply tank 44, a boost pump 46, an oil supply line 37 which routes oil into the torque converter, and an oil drain line 47 which returns oil back to the supply tank 44. A hydraulic cylinder 49 is placed in the system so as to mutually pass through the oil supply line 47 and the oil drain line 48, the effect being that both the hydraulic fluid going to the torque converter 34 and that returning to the tank must pass through the cylinder 49. Disposed within the cylinder 49 is a reciprocal piston 51 having a pair of spools 52 and 53 being spaced in such a manner that when the piston is moved to the right end of the cylinder as is shown in FIG. 2, the spool 52 is aligned with the oil drain line 48 to thereby act as a shut-off valve to prevent the return of oil to the oil supply tank 44, whereas the spool 53 is offset to the right from the oil drain line 47 to thereby allow the oil from the pump 46 to pass through the oil supply line 47 and the cylinder to the torque converter 34. The valve piston 51 is moved to the position shown, against the leftward biasing force of a spring 54, by way of a typical solenoid 56 electrically energized through line 57. When the energy to the solenoid 56 is removed, the biasing spring 54 pushes the piston to the left so that the spool 52 no longer is aligned with the oil drain line 48 and the spool 53 is now aligned with the oil supply line 47. Thus the supply of oil from the pump 46 to the torque converter 34 is cut off and that oil which is in the torque converter 34 is allowed to drain through the oil drain line to the oil supply tank. Such is the position of the valve during periods in which torque is not required to be transmitted to the core engine rotor, and during which the torque converter is decoupled by removal of the hydraulic fluid to thereby remove the load from the fan rotor.

The solenoid 56 of the servovalve 50 controlled through lead 57 by way of an AND circuit which operates in response to the core speed and throttle setting inputs along lines 59 and 61, respectively. More specifically, if the core speed is greater than a predetermined rotational speed (e.g., engine idle speed), then the AND circuit 58 will act to de-energize the solenoid and move the servovalve so as to allow the hydraulic fluid to drain from the torque converter 34. Similarly, if the throttle is placed in an off position to indicate that the pilot does not desire that the engine be lit off, then the AND circuit 58 will also prevent the solenoid 56 from being energized.

Consider now a situation where a flameout has occurred to the engine and the windmill speed to the core is not sufficient for a relight. Since the core rotational speed is less than that at idle, and since the throttle is placed in an "on" position, the AND circuit 58 will activate the servovalve 50 and allow for the torque converter to be filled with hydraulic fluid. Rotary motion will then be transmitted from the fan rotor to the core rotor so it reaches a speed sufficient to sustain a relight. Following a successful relight, the core speed will accelerate to speed greater than that of the fan rotor speed, and the overrunning clutch 43 will automatically disengage the gear train between the two rotors. At the same time the core speed will have reached a point where the signal along line 59 into the AND circuit 58 will be lost to thereby de-energize the solenoid 56 and allow the piston 51 to move to the left to shut off the oil supply to the torque converter 54 and to further allow the oil within the torque converter to drain into the supply tank 44 along line 48. The system will then remain in this condition until such time as the core speed again is reduced to a point below idle speed as would happen if a flameout again occurred.

Having thus described the invention, what is considered novel and desired to be secured by Letters Patent of the United States is:

1. An improved air-start system for a turbofan engine of the type having compressor rotor and fan rotor assemblies independently driven by separate turbine means wherein the improvement comprises a torque converter drivingly connectable between said compressor and fan rotors during periods of in-flight windmilling such that the fan can be made to impart rotary motion to the compressor to accelerate it to a speed sufficient to accommodate an air start.

2. An improved air-start system as set forth in claim 1 and including an overrunning clutch on the output side of said torque converter to prevent the compressor rotor from imparting energy back into the torque converter following engine start.

3. An improved air-start system as set forth in claim 1 and including control means responsive to certain operational parameters to automatically suspend transmission of energy through said torque converter during the existence of predetermined conditions and resume transmission of energy during nonexistence thereof.

4. An improved air-start system as set forth in claim 3 wherein one of said operational parameters is engine throttle position.

5. An improved air-start system as set forth in claim 3 wherein one of said operational parameters is compressor speed.

6. An improved air-start system as set forth in claim 3 wherein said control means is capable of selectivity removing and replacing hydraulic fluid in said torque converter.

7. An improved turbofan engine of the type having a compressor and a fan adapted to bypass a portion of the airflow around the compressor during engine operation, and separate turbine means for driving the compressor and fan, wherein the improvement comprises a torque converter connected at its one end to the fan rotor and at its other end to the compressor rotor for imparting rotary motion during periods of in-flight windmilling from the fan to the compressor to accelerate it to a speed sufficient to accommodate an air start.

8. An improved turbofan engine as set forth in claim 7 and including an overrunning clutch connected between said torque converter other end and the compressor.

9. An improved turbofan engine as set forth in claim 7 and including means for directing the flow of hydraulic fluid to and from said torque converter in response to certain operational parameters.

10. An improved turbofan engine as set forth in claim 9 wherein one of said operational parameters is engine throttle position.

11. An improved turbofan engine as set forth in claim 9 wherein one of said operational parameters is compressor speed.

* * * * *